(12) United States Patent
Daul (10) Patent No.: US 9,187,285 B2
(45) Date of Patent: Nov. 17, 2015

(54) SLITTER-WINDER OF A FIBER PRODUCTION LINE

(71) Applicant: Metso Paper, Inc., Helsinki (FI)

(72) Inventor: Michael J. Daul, Appleton, WI (US)

(73) Assignee: Valmet Technologies, Inc., Espoo (FI)

( * ) Notice: Subject to any disclaimer, the term of this patent is extended or adjusted under 35 U.S.C. 154(b) by 197 days.

(21) Appl. No.: 13/680,843

(22) Filed: Nov. 19, 2012

(65) Prior Publication Data

US 2014/0138471 A1 May 22, 2014

(51) Int. Cl.
*B65H 35/04* (2006.01)
*B65H 35/02* (2006.01)
*B65H 19/22* (2006.01)
*B65H 26/00* (2006.01)
*B65H 19/26* (2006.01)

(52) U.S. Cl.
CPC ............ *B65H 35/02* (2013.01); *B65H 19/2246* (2013.01); *B65H 19/265* (2013.01); *B65H 26/00* (2013.01); *B65H 19/26* (2013.01); *B65H 2301/41891* (2013.01); *B65H 2301/41893* (2013.01); *B65H 2407/10* (2013.01)

(58) Field of Classification Search
CPC .... B65H 19/2246; B65H 18/20; B65H 19/26; B65H 19/28; B65H 2301/41891
USPC ................. 242/527, 527.2, 527.3, 541, 541.1, 242/541.4, 542, 542.4
See application file for complete search history.

(56) References Cited

U.S. PATENT DOCUMENTS

| | | | | |
|---|---|---|---|---|
| 1,306,711 A * | 6/1919 | O'Malley | ........................ | 242/539 |
| 1,575,088 A * | 3/1926 | Bartlett | ........................... | 74/613 |
| 2,651,076 A * | 9/1953 | Hornbostel | .................... | 425/194 |
| 3,256,395 A * | 6/1966 | Grau et al. | ................... | 200/52 R |
| 3,381,911 A * | 5/1968 | Held et al. | .............. | 242/527.3 |
| 3,918,654 A * | 11/1975 | Okubo et al. | .............. | 242/527.2 |
| 4,043,731 A * | 8/1977 | Kratzmann et al. | .......... | 425/366 |
| 4,157,794 A * | 6/1979 | Brandauer et al. | ............. | 242/521 |
| 4,282,963 A * | 8/1981 | Kafura et al. | ................. | 192/133 |
| 4,345,722 A * | 8/1982 | Kuhn | .......................... | 242/527.4 |
| 4,368,855 A | 1/1983 | Schönmeier et al. | | |
| 4,370,193 A * | 1/1983 | Knauthe | ..................... | 242/527.2 |
| 4,422,588 A * | 12/1983 | Nowisch | .................... | 242/524.1 |
| 4,516,735 A * | 5/1985 | Snygg | ......................... | 242/527.3 |
| 4,576,343 A * | 3/1986 | Scheuter et al. | ........... | 242/533.2 |
| 4,601,441 A * | 7/1986 | Oinonen et al. | ............ | 242/527.3 |
| 4,867,055 A * | 9/1989 | Hutter et al. | .................. | 100/173 |
| 4,974,786 A * | 12/1990 | Dropczynski | .............. | 242/542.3 |
| 5,024,155 A * | 6/1991 | Jahn | ............................. | 101/216 |
| 5,042,373 A * | 8/1991 | Fenzau et al. | ................. | 100/327 |
| 5,067,663 A * | 11/1991 | Dropczynski | ............. | 242/527.2 |

(Continued)

*Primary Examiner* — Emmanuel M Marcelo
*Assistant Examiner* — Michael Gallion
(74) *Attorney, Agent, or Firm* — Stiennon & Stiennon (57) ABSTRACT

The invention relates to a winder guard in a two-drum winder which combines the web cutting and the winder guard functions to one device. The winder guard is movable in an arcuate path around the front (downstream) winding drum. The winder guard has an upstream edge on which a cutting blade is mounted so as to align with the winder guard, and pass between the two winding drums and then to be bent to engage the rear (upstream) winding drum so as to cut a plurality of partial fiber webs WP slit from a machine web W in a slitter and wrapped around the rear winding drum onto winding cores 14 around which customer rolls 10 are wound. Adequate space beneath the winding drums for maintenance and broke cleanup is provided by winder guard movement along an arcuate path around the front winding drum.

9 Claims, 7 Drawing Sheets

(56) References Cited

U.S. PATENT DOCUMENTS

| | | | |
|---|---|---|---|
| 5,241,903 A * | 9/1993 | Lampic | 100/349 |
| 5,257,748 A * | 11/1993 | Morizzo | 242/527 |
| 5,301,890 A * | 4/1994 | Schnell | 242/532 |
| 5,427,020 A * | 6/1995 | Conrad et al. | 100/349 |
| 5,537,922 A * | 7/1996 | Becker | 101/216 |
| 5,845,867 A * | 12/1998 | Hould et al. | 242/527 |
| 5,924,647 A * | 7/1999 | Dorfel | 242/542 |
| 6,305,635 B1 * | 10/2001 | Looser | 242/527.3 |
| 6,338,451 B1 * | 1/2002 | Dorfel et al. | 242/527 |
| 6,588,698 B2 * | 7/2003 | Gangemi et al. | 242/534 |
| 6,616,085 B2 * | 9/2003 | Fuchs et al. | 242/534 |
| 7,175,127 B2 * | 2/2007 | Butterworth et al. | 242/542.1 |
| 7,458,539 B2 * | 12/2008 | Haven et al. | 242/532 |
| 8,050,778 B2 * | 11/2011 | Manner | 700/17 |
| 8,500,057 B2 * | 8/2013 | Åkerlund et al. | 242/542 |
| 8,991,739 B2 * | 3/2015 | Niwa et al. | 242/548 |
| 2003/0150952 A1 * | 8/2003 | Fuchs et al. | 242/542 |
| 2005/0139714 A1 * | 6/2005 | Benvenuti et al. | 242/527 |
| 2006/0011768 A1 * | 1/2006 | Czechowicz et al. | 242/527 |

* cited by examiner

SLITTER-WINDER OF A FIBER PRODUCTION LINE

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to a slitter-winder of a fiber web production line in general, and in particular to guards for increased safety of a slitter-winder and severing of the fiber web in the slitter winder.

It is known that a fiber web, e.g. paper, is manufactured in machines which together constitute a paper-manufacturing line which can be hundreds of meters long. Modern paper machines can produce over 450,000 tons of paper per year. The speed of the paper machine can exceed 2,000 m/min and the width of the fiber web can be more than 11 meters.

In paper-manufacturing lines, the manufacture of paper takes place as a continuous process. A fiber web completing in the paper machine is reeled by a reel-up around a reeling shaft, i.e. a reel spool, into a parent roll, the diameter of which can be more than 5 meters and the weight more than 160 tons. The purpose of reeling is to modify the fiber web manufactured as planar to a more easily processable form. On the reel-up located in the main machine line, the continuous process of the paper machine breaks for the first time, and shifts into periodic operation.

The web of the parent roll produced in paper manufacture is full-width and can be more than 100 km long so it must be slit into partial webs with suitable width and length for the customers of the paper mill and wound around cores into so-called customer rolls before delivering them from the paper mill. This slitting and winding up of the web takes place as known in an appropriate separate machine, i.e., a slitter-winder.

On the slitter-winder, the parent roll is unwound, the wide web is slit on the slitting section into several narrower partial webs which are wound up on the winding section around winding cores, such as spools, into customer rolls. When the customer rolls are completed, the slitter-winder is stopped and the wound rolls, i.e., the so-called set, is removed from the machine. Then, the process is continued with the winding of a new set. These steps of so-called set change are repeated in sequences periodically until paper runs out of the parent roll, whereby a parent roll change is performed and the operation starts again as the unwinding of a new parent roll.

Slitter-winders employ winding devices of different types depending on, inter alia, the type of the fiber web being wound. On slitter-winders of the two drum winder type, the web is guided from the unwinding via guide rolls to the slitting section where the web is slit into partial webs which are further guided to the winding (support or carrier) drum of the two drum winder, and slit component webs are wound around a winding core supported on two drums or one drum or a set of drums or two sets of drums. The present invention relates to two-drum winders with two winding drums.

On many two drum winders, space beneath the winding drums is limited, making maintenance and paper broke (scrap) cleanup difficult. In some cases the limited space is also a safety concern.

In two drum winders various web cutting blade arrangements have been used to sever the web from a completed wound roll during the set change sequence so it can be started onto a new set of cores, and to sever the web during the threading process. The most prevalent method has been a blade mounted from a support beam with the blade coming up between the front and rear winding drums, which requires various linkage and cam roller guides to guide the cross-machine support beam and considerable space is required under the winding drums.

During recent years a splice guard (a guard) has been used on some winders to cover the top of the rotating front (downstream) winding drum to protect operators from contact or entry into the nip produced by the front drum and a partially wound roll when threading the winder to a partially wound roll after a web break. The movable winder guard is typically pivoted about the axis of the front winding drum.

The cutting operation has been provided either with a cutting blade moving vertically in the space between the winding drums or with a cutting blade moving in an arcuate path around the rear (upstream) winding drums. On many winders, space beneath the winding drums is limited making maintenance and paper broke (scrap) cleanup difficult. In some cases the limited space is also a safety concern. Thus providing also the safety guard with the front winding drum has been problematic as the construction space needed raises further problems in this limited space beneath the winding drums.

In U.S. Pat. No. 4,368,855 is disclosed a known web winding apparatus comprising a pair of space apart support rolls (winding drums) for a core tube (winding core) to be placed thereon, means for driving at least one of said rolls, means for delivering a web onto a core tube supported on said rolls, and means for cutting (severing) the web when it is desired to replace the core tube, wherein said cutting means comprises an elongated blade extending longitudinally of the rolls, and means for advancing and retracting said blade in the space between said rolls so as to contact and cut said web in advanced position and to withdraw said web into standby position between cuttings. The blade can be caused to move in a straight line or an arcuate path between active and inactive positions and guide means may be provided to prevent skewing. It is disclosed that in this known arrangement the cutting means move in the straight line in a vertical direction between the support rolls or in the arcuate path around the rear, i.e. the upstream support roll.

In U.S. Pat. No. 6,616,085 is disclosed a winding splicing nip guard, which is mounted for rotation about the downstream drum of a winder having two spaced apart winding drums which support a customer roll. The guard has a D-shaped leading-edge which approaches the customer roll. The leading-edge is articulated so that if an operator hand becomes wedged between the leading-edge and the customer roll, articulation on the leading-edge closes a switch which brings the winder to a stop. A hydraulic actuator extends between a lowermost radial edge of each sector shaped extension and a fixed support. Operation of the hydraulic actuator causes the guard to rotate about the axis of the downstream winding drum so as to be between the operator and the downstream side of the winding drum. The leading edge of the guard is positioned to limit operator access to the nip formed between the customer roll and the downstream winding drum.

U.S. Pat. No. 6,588,698 discloses a winding machine comprising a winder drum, and a roll core at least partially supported on the winder drum, and a web of material being wound around the roll core to form a web reel in response to rotation of the winder drum and the web reel, the point where the web reel rotates into contact with the support drum being called the nip. The winding machine further includes a nip safety guard having a finger presence sensor, the nip safety guard supporting the finger presence sensor adjacent the web reel and the support drum. A moving mechanism moves and locates the nip safety guard and the finger presence sensor thereon depending on the size of the web reel so that the finger presence sensor is located closely spaced from the web reel and thus spaced a safe distance from the nip. The safety guard moving mechanism further is controlled by a controller which receives input from a web reel height measuring instrument, which allows proper positioning of the guard by the moving mechanism to position the finger sensor. More particularly, the winding machine nip safety guard comprises a safety shield that covers the support drum and is mounted for rotation about the support drum, the safety shield having an edge which can be moved to closely approach the web reel. The moving mechanism is used to move the safety shield away from the nip during higher speed winding and towards the nip before the operator approaches the winder.

SUMMARY OF THE INVENTION

The winder has two spaced apart winding drums which support at least one, and usually a plurality of customer rolls. Upstream of the winder a slitter cuts a wider or machine fiber web into narrower particular partial webs. The slitter slits the full width fiber web as it is being unwound from a parent roll into the partial webs. After the full width fiber web has been slit into partial webs, the partial webs partially wrap the upstream i.e., rear, winding drum and then wrap winding cores to form the customer rolls. Both or at least one of the winding drums are driven to cause the customer rolls to rotate. A movable winder guard is mounted for rotation about the downstream i.e., front, winding drum. The downstream edge of the movable guard is provided to limit operator access to the nip formed between the customer roll and the downstream winding drum and the upstream edge of the movable guard is provided with a cutting means for severing the fiber web.

The invention combines web cutting and the winder guard functions in one device in which the winder guard has a hingedly mounted cutting blade at the upstream edge of the guard. The guard is mounted for movement in an arcuate path around the front i.e., downstream, winding drum, of the winder, so that the blade moves to a position where it cuts the web as the web extends to costumer rolls being formed on the winder.

This approach of arranging a web cutter, cutting blade, or other cutting means, in connection with the front winding drum and combining the web blade with the movable winder guard into one combined device requires little or no space under the winder and thus provides adequate space beneath the winding drums for maintenance and broke cleanup. The winder guard, required for the guard function simultaneously provides support for the web cutting blade. Thus the combination web cutting blade and movable guard eliminates the need for a separate web cutting blade and its cross-machine support. Combining the web cutting and safety guard functions into one device reduces the number of components required and potentially reduces manufacturing and machine maintenance costs.

It is a feature of the present invention to provide a winder with a movable guard at the front winding drum to increase operator safety and prevent the operator from coming in contact with a nip formed between the downstream winding drum and the customer roll and to provide the winder with a movable guard with cutting means to sever the partial fiber webs.

It is a further feature of the invention to provide the web cutting means with a hingedly mounted web cutting blade.

It is a yet further feature of the present invention to provide a winder with a movable guard with a cutting blade, and incorporating a core loader.

According to yet further features of the present invention the winder guard comprises at least a one part structure, covering at least a part of the circumference of the front winding drum, and spaced apart from the surface of the front winding drum. Further the winder guard may comprise a movable part and a fixed part.

According to yet further features of the present invention the winder guard is arranged to be movable on an outside support guide, or the winder guard is arranged to be supported on support structures of the front winding drum.

The invention and its further objects, features, and advantages may be more fully understood by reference to the following drawings.

DESCRIPTION OF THE PREFERRED EMBODIMENTS

During the course of this description like numbers and signs will be used to identify like elements according to the different views which illustrate the invention. In the figures the direction of movement or of rotation of the drums 11, 12, and the rolls 10 are indicated by arrows.

Figure 1:
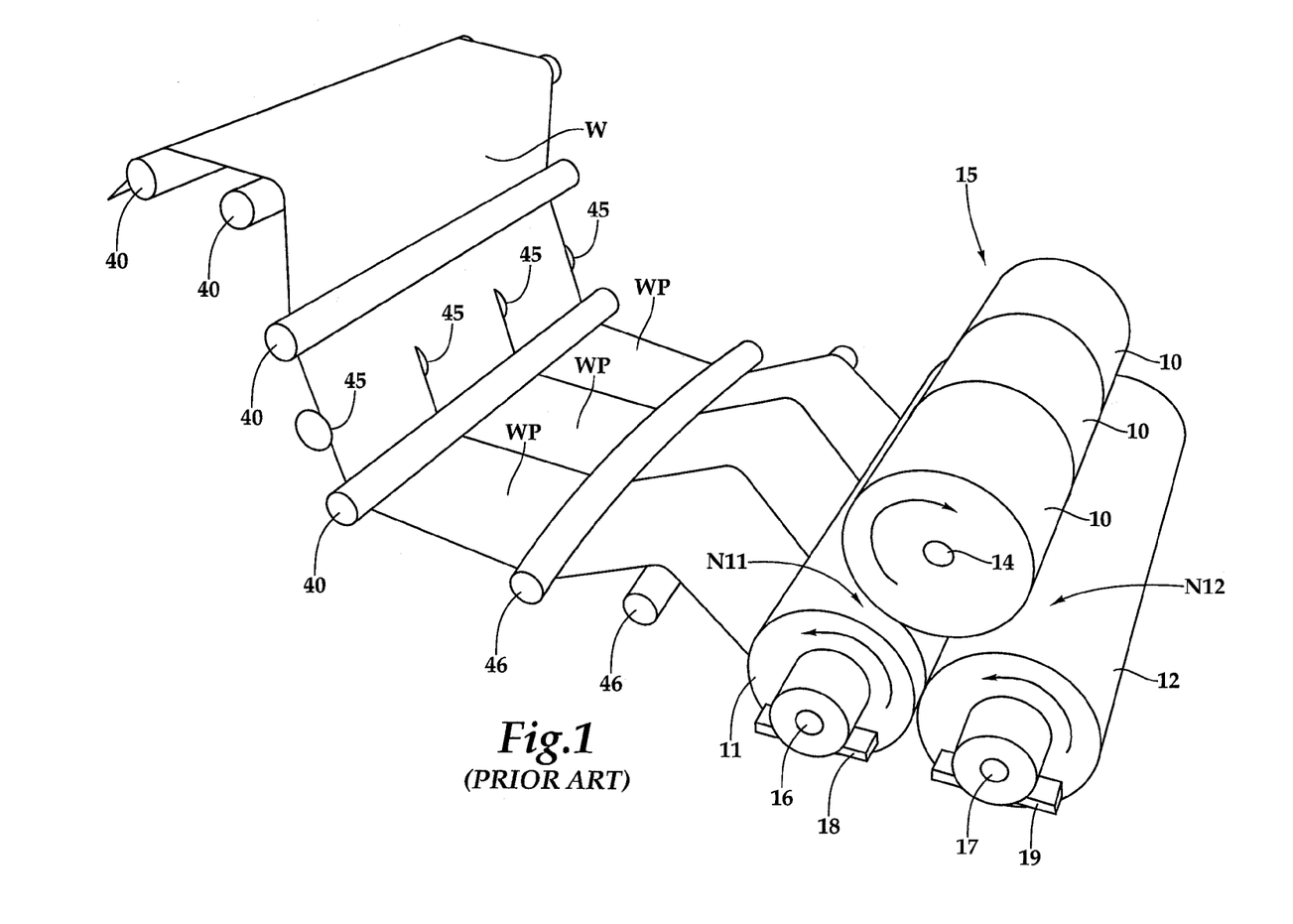
FIG. 1 is a schematic three dimensional view of a two-drum winder of a slitter winder.

As shown in FIG. 1, a winder 15 has a rear winding drum 11 and a front winding drum 12 which support customer rolls 10. The rear winding drum 11 has a driving shaft 16, which is supported at each end by a bearing housing 18 and correspondingly the front winding drum 12 has a drum shaft 17, which is supported at each end by a bearing housing 19. The customer rolls 10 form a first nip N11 with the rear winding drum 11 and a second nip N12 with the front winding drum 12. Partial fiber webs WP are formed by slitting from a parent web W which is unwound from a parent roll (not shown). After longitudinal slitting by slitter blades 45 the partial fiber webs WP wrap around the rear winding drum 11 and onto winding cores 14 around which the customer rolls 10 are wound. In FIG. 1, guide rolls 40 guide the web W from an unwinder (not shown) to the slitter blades 45 by which the full width fiber web W is longitudinally slit into partial webs WP and after slitting the partial webs WP are guided by guide roll(s) 40, the number of guide rolls depending on the layout of the slitter-winder. Web spreading rolls 46 are located on both sides of the partial webs. The guide rolls 40, and the spreading rolls 46 guide the partial webs WP to the winder 15 in which the customer rolls 10 are wound around the winding cores 14 by the winding drums 11, 12.

Figure 2:
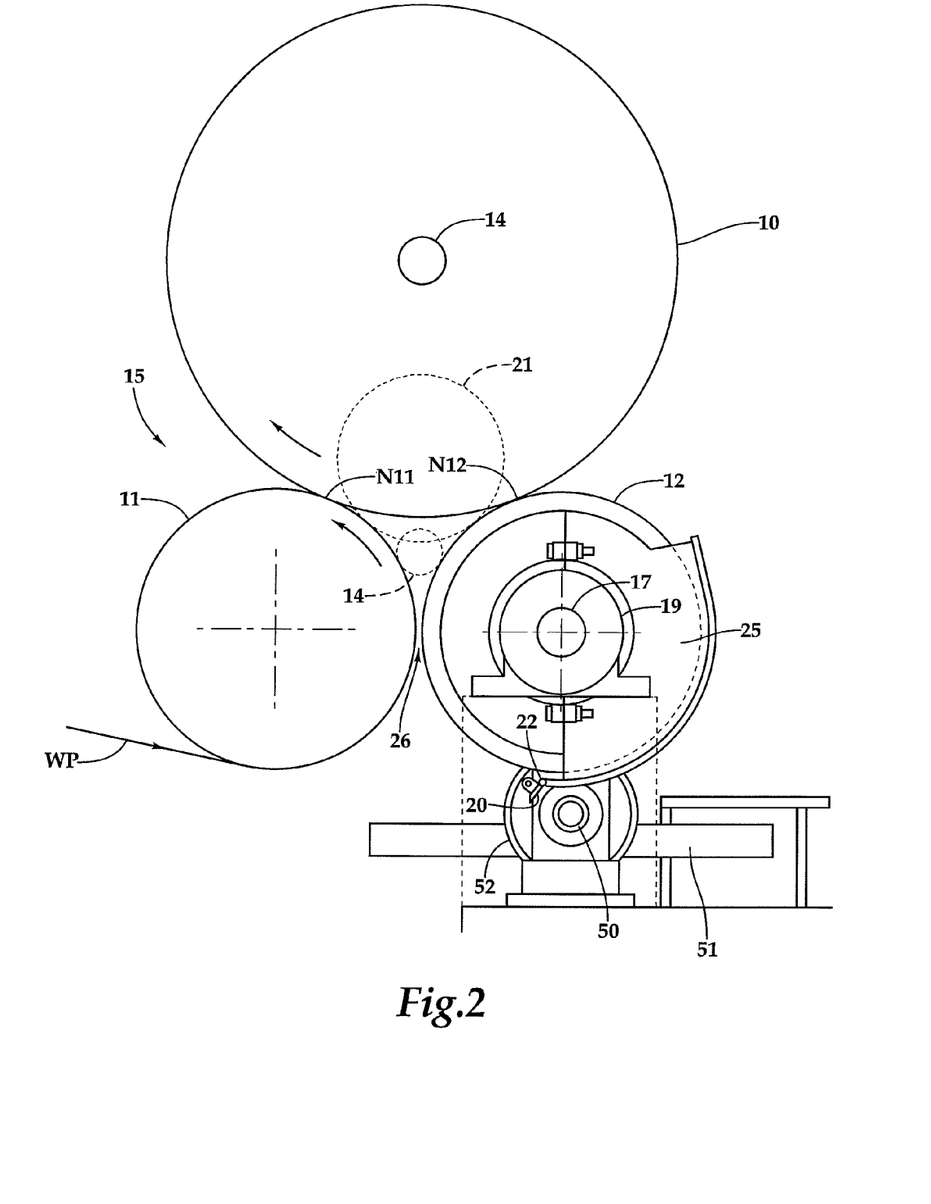
FIG. 2 is a side elevational view of the winder of FIG. 1 showing the combination of winder guard and web cutting blade according to one embodiment this of invention.
Figure 3:
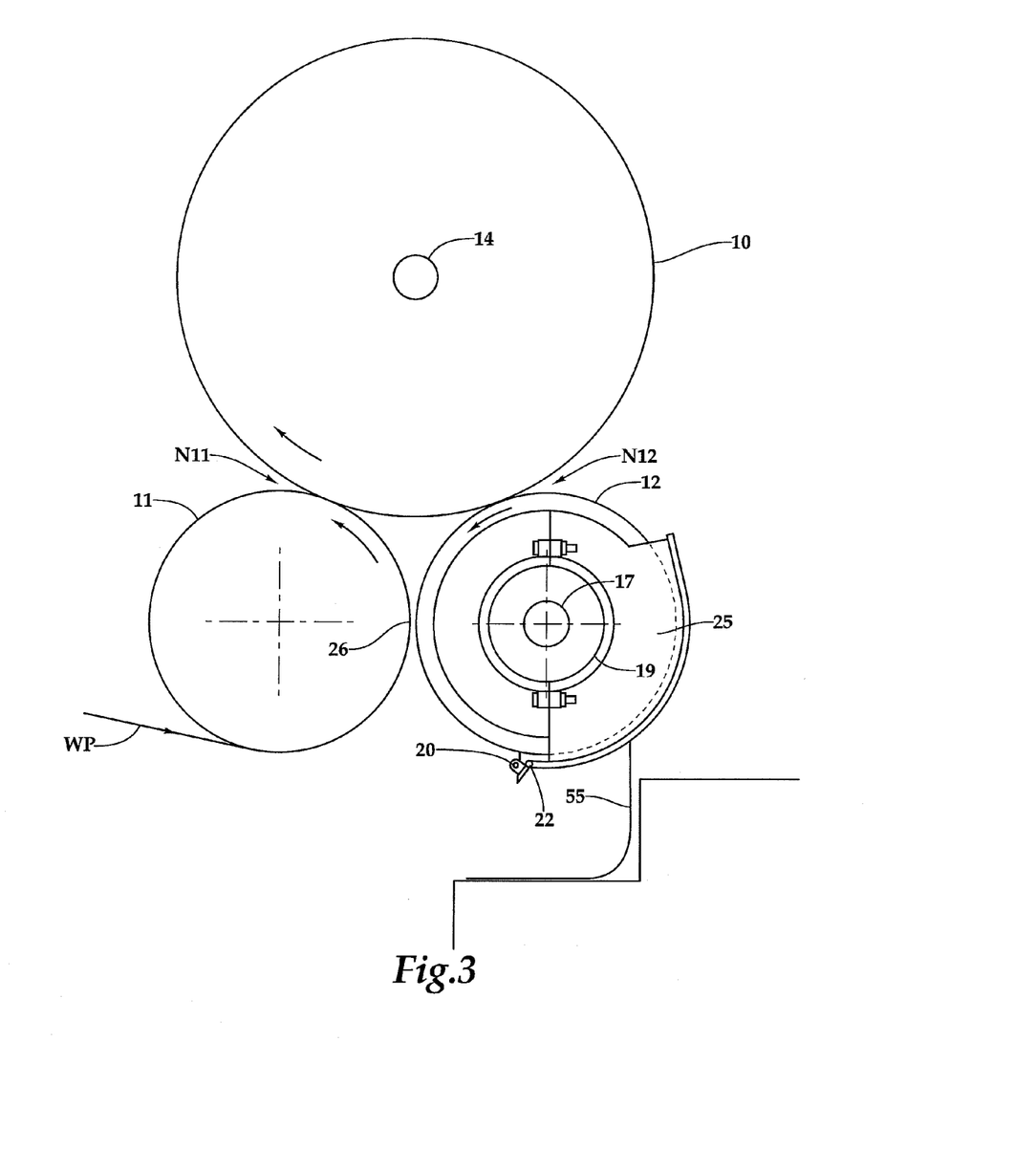
FIG. 3 is a side elevational view of the winder and the combination of a winder guard and the web cutting blade of FIG. 2 without the drive shaft and the bearing housing of the front winding drum and without the actuating means of the web cutting and winder guard device.
Figure 4:
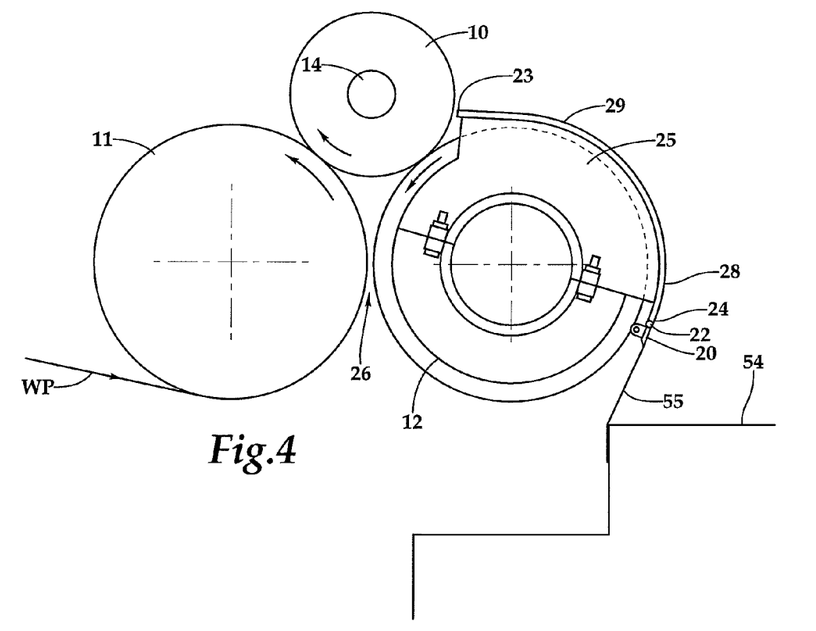
FIG. 4 is a side elevational view of the winder and the combination device of winder guard and web cutting blade of FIGS. 2-3 in guard position.
Figure 10:
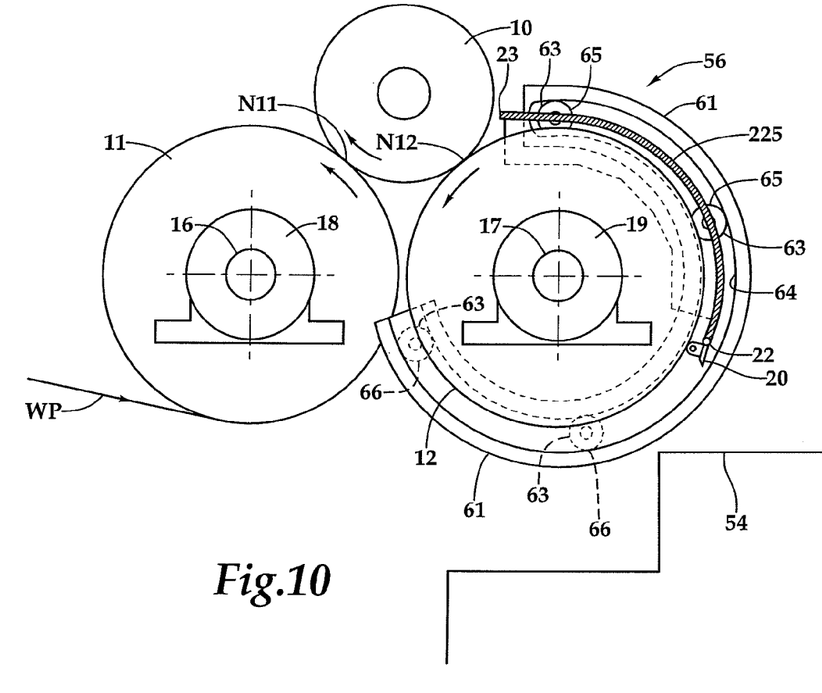
FIG. 10 is a side elevational view of another embodiment of the winder and the combination device of winder guard and web cutter.

As shown in FIGS. 2 and 3 the winder 15 has two winding drums, rear winding drum 11 and a front winding drum 12, on which the customer rolls 10 are supported and wound around the winding cores 14. The front winding drum 12 is provided with a combination device formed by a movable winder guard 25 with cutting blade 20 hingedly joined to the guard by a joint or hinge 22. The cutting blade 20 forms a means for cutting the webs WP. The circumferential extent of the movable winder guard 25 with the hinged cutting blade 20 is such that it protects any object, for example a hand of an operator, from entering the winding nip N12 when the guard is positioned as shown in FIG. 4. The guard may comprise a one part structure, as shown in FIG. 10, or a two part structure, as shown in FIGS. 2-9, or the guard may be structured of several parts attached to each other.

In FIG. 2 by dashed lines has been illustrated schematically progress of winding from cores 14 to slightly wound customer rolls 21 to completed customer rolls 10 shown in solid lines.

As shown in FIG. 2, the front winding drum 12 is provided with a drum shaft 17 for rotational movement and bearing housings 19 support the drum shaft 17 at each end. The movable winder guard 25 is supported on the bearing housing 19. A machined pivot bearing surface for the movable guard 25 is integrated as part of the bearing housing 19, but can be mounted separately. Actuating means 50 are provided for the movement of the movable guard 25. The actuating means 50 is shown as a hydraulic cylinder type rotary actuator, but could use a pneumatic or electrical actuator. In FIG. 2 the actuating means 50 comprise a cylinder 51 with reciprocating motion that rotates a gear rim 52 that transmits the rotational movement to the movable winder guard 25 with a corresponding counter element (not shown) on the other side of the winding drum 12.

As shown in FIG. 3, the combination device of the winder guard 25 and the web cutting blade 20 is in the home position with the winder guard's upstream edge having a joint formed by the hinge 22 which connects to the cutting blade 20. The winder guard may also comprise a safety curtain 55 connected to the guard 25 between an upstream edge and a downstream edge of the guard so that the curtain covers the space between the front winding drum and the floor 54 or a corresponding support structure on the operating side of the front winding drum.

In FIGS. 2-7 is schematically shown one embodiment of the invention. Typically the operator, when necessary, accesses the customer roll 10 facing the front winding drum 12. In order to prevent the operator's hand from being drawn into the nip N12, the winder comprises a movable winder guard 25. The movable winder guard 25 extends substantially over the width of the winder and extends circumferentially over the front winding drum 12 covering at least part of the circumference of the front winding drum 12. In addition to the movable winder guard 25 a flexible guard, for example a safety curtain 55 such as a flexible cloth skirt can be provided to supplement the guarding function of the movable guard 25 such that the safety of operating personnel is enhanced. The winder guard 25 has been arranged to move an arcuate path around the front of the winding drum 12 by the actuating means 50 that is advantageously a hydraulic cylinder type rotary actuator. At one end of the movement path, as shown in FIG. 4 the movable guard 25 is positioned such that its downstream end 29 protects the operator from the nip N12 area between the forming customer roll 10 and the front winding drum 12. At the other end of the movement path, shown in FIG. 5, the movable guard 25 is positioned such that its upstream end 28 with the cutting blade 20 is located in the space between the winding drums 11, 12 and the customer roll 10 such that the cutting blade 20 is positioned for severing the fiber web WP against the rear winding drum cylindrical surface 27. The hinged blade 20 running across the machine is added to the upstream edge of the movable guard 25, using the movable guard 25 as its cross-machine support structure. The cutting blade forming the cutter of the web cutting means 20 is on the opposite edge 24 of the movable winder guard 25 as that of the edge 23 used to protect the operator from the customer roll 10 to the front drum nip N12. The movable guard is provided with the cutting blade 20 that is turnably attached to the guard 25 by the hinge 22.

As shown in FIG. 4 the movable guard 25 is rotated up (counterclockwise) from its "home position" to a position over the top of the front winding drum 12 to provide the guarding function.

Figure 5:
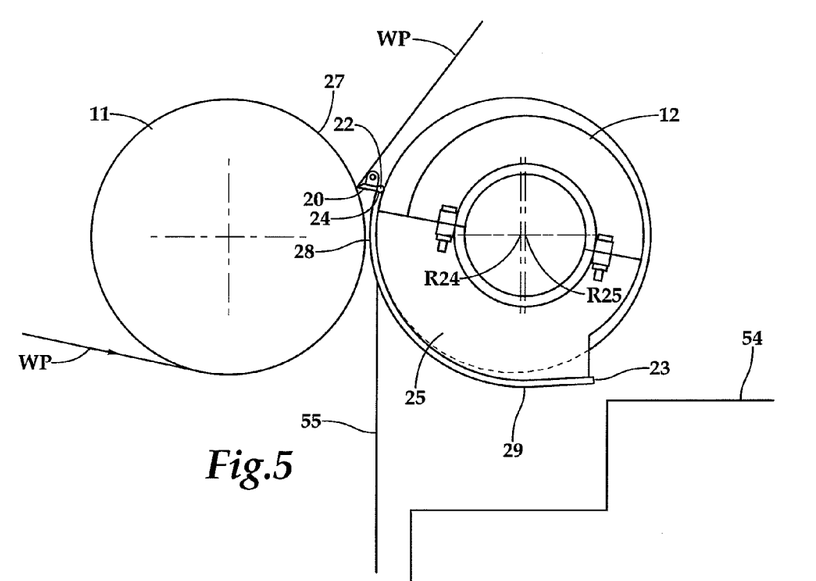
FIG. 5 is a side elevational view of the winder and the combination device of winder guard and web cutting blade of FIGS. 2-3 in web cutting position.

As shown in FIG. 5 the movable guard 25 is rotated in the opposite direction (clockwise) from its "home position" to the web cutting position. When the movable guard 25 is in its clockwise position, the hinged web cutting blade 20 is rotated (counterclockwise) so the cutting blade 20 cutting edge, for example formed by cutting teeth, is pointing toward the rear winding drum 11 so the webs WP can be torn against the cutting edge. Actuation of the hinged cutting blade's 20 rotation can be by an actuator or a linkage arrangement tied to movable guard's 25 rotation. Rotation of the movable guard 25 can be generated by electrical, hydraulic, or other type of actuator through a linkage, gear train, or other mechanical means.

Figure 6:
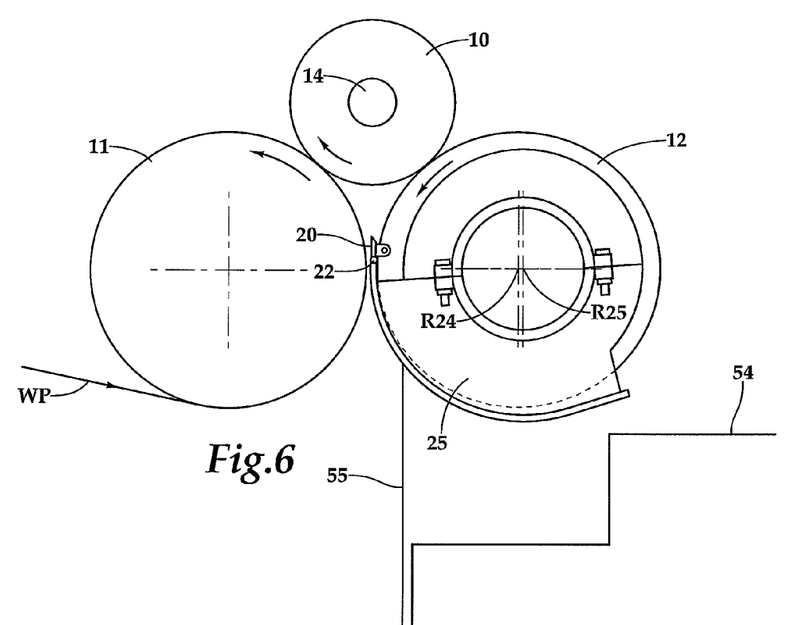
FIG. 6 is a side elevational view of the winder and the combination device of winder guard and web cutting blade of FIGS. 2-3 in a position where the web cutting blade is between the winding drums.

As shown in FIG. 6 the web cutting blade 20 and its hinge arrangement 22 must be able to rise between the front and rear winding drums 12, 11 to get to the cut position. The gap 26 between the drums 11, 12 varies with the brand, model, and winding drum diameter of the particular winder. The drum gap 26 is typically in the 20 mm to 30 mm range. This means that the cutting blade 20 and its cross machine support formed by the winder guard 25 in the area near the blade 20 is advantageously close to the front winding drum 12 as it passes between the drums 11, 12. Further, the blade 20 should be movable between a first position substantially aligned with the guard body, so as to pass through the gap 26 between the rear winding drum 11 and the front winding drum 12, and a second position extending away from the winder guard body 25 toward, or to engage, the rear winder drum.

Figure 7:
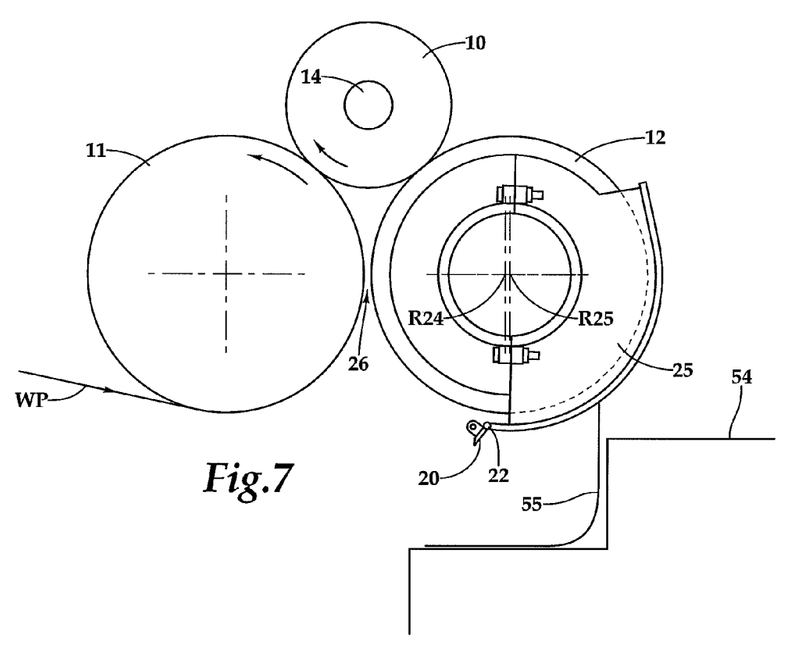
FIG. 7 is a side elevational view of the winder and the combination device of winder guard and web cutting blade of FIGS. 2-3 in the home position during winding of a set of customer rolls.

As shown in FIG. 7 when the winder is running and the unit is at its "home position", the movable guard 25 and the cutting blade 20 should be further away from the front drum 12 surface to avoid damage if the fiber web W being wound would break and start to wrap the front drum 12.

To provide the increased clearance between the front drum 12 and the movable guard 25 in the home position, the pivot bearing surface for the movable guard 25 defines an axis R25 such that the guard is eccentric to the rotational axis R24 of the front drum 12. The machined pivot bearing surface for the movable guard 25 is integrated as part of the bearing housing 19, but can be mounted separately. There are other mechanical means to vary the clearance, but the eccentric pivot is the simplest form.

As shown in FIG. 7, centers of the rotational axis R24 of the front winding drum 12 and the rotational axis R25 of the movable winder guard 25 are spaced apart. The rotational centers R24, R25 are spaced apart for avoiding damage during rotational movement of the movable guard 25 so that the upstream edge of the movable guard 25 is during the movement through the gap 26 between the winding drums 11, 12 as close as possible to the front winding drum 12 and farther from the rear winding drum 11 during winding such as shown in FIG. 7.

The movable guard 25 can also arranged to be rotatable around the same rotational center R24 as the front winding drum 12.

Figure 8:
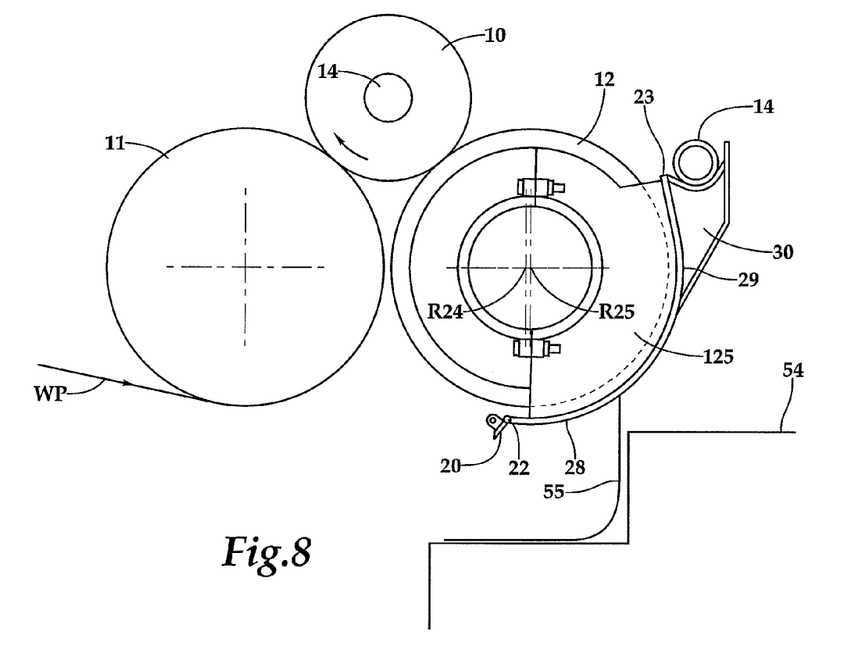
FIG. 8 is a side elevational view of the winder and the combination of winder guard and web cutting blade and a core loader in position where the web cutting blade is in home position and the winding of the new set of customer rolls has begun.
Figure 9:
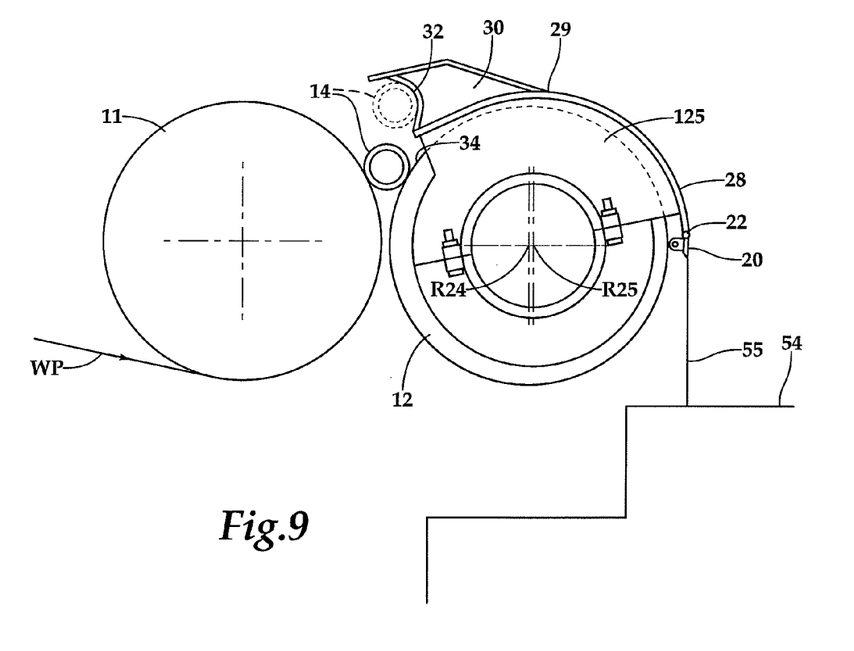
In FIG. 9 is a side elevational view of the winder and the combination of winder guard and web cutting blade and a core loader of FIG. 8 in position where the cores are moved onto the support of the winding drums of the winder.

In FIGS. 8-9 is shown an embodiment in which a movable winder guard 125 is shown which also has a core loader 30 for loading at least one winding core 14 to be supported by the winding drums 11, 12. The core loader 30 is attached to the downstream end 29 of the winder guard 125. The core loader 30 has portions forming a space 32 into which the core(s) 14 to be loaded are placed. The core(s) 14 are fed onto the support of the core loader 30 when the guard 125 is positioned in home position which is illustrated with respect to guard 125 in FIG. 7. The movable guard 125 is rotated around the front winding drum 12 such that the core loader 30 is positioned above an upper space 34 defined between and above the winding drums 11, 12 as shown in FIG. 9. The winder guard 125 substantially covers the upper part of the front winding drum when the core 14 is released and placed onto the winding drums 11, 12 for the beginning of winding.

The movable guard 225 can also be provided with an attaching and movement arrangement 56 located outside the winding drum 12, as shown in FIG. 10. For example a guide arrangement 61 onto which the movable guard 225 is movably attached to provide the movement path so as to obtain the functions of the movable guard 225 for guarding the nip N12 and for cutting the web(s) WP.

In the embodiment according to FIG. 10 the combination device of winder guard 225 and cutting means with a hinged cutting blade 20 is provided with support rolls 63 that are attached to the guard 225 and move in guide grooves 64 of a guide support 61. The guard 225 moves from the guard position shown by support rolls 63 at positions 65, to cutting position, shown by support roll positions 66. Thus the movement path of the winder guard 225 is defined by the guide support 61 and its guide grooves 64. The guard 225 is provided by an actuator (not shown) for the movement. The actuator is for example a hydraulic cylinder or a chain drive mechanism. The winder guard 225 comprises also cutting means 20 and optionally a core loader (not shown) as described above. In this figure the rear winding drum 11 has a driving shaft 16, which is supported at each end by a bearing housing 18 and correspondingly the front winding drum 12 has a drum shaft 17, which is supported at each end by a bearing housing 19.

It should be understood that the two drum winder as used in the claims includes winders with two or more drums unless more specifically limited, e.g., as having only two winding drums.

It should be understood that the two drum winder can be used for forming costumer rolls of such as paper, board, or tissue.

While the invention has been described with reference to the preferred embodiments thereof, it will be appreciated by those skilled in the art that modifications can be made to the structure and elements of the invention without departing from the spirit and scope of the invention as a whole.

It is understood that the invention is not limited to the particular construction and arrangement of parts herein illustrated and described, but embraces all such modified forms thereof as come within the scope of the following claims.

I claim:

1. A winder wherein a paper web source defines an upstream direction toward the paper web source, the winder comprising:
   a front winding drum mounted for rotation;
   at least one winding core;
   a rear winding drum mounted for rotation, and positioned in the upstream direction from and closely spaced from the front winding drum, so as to form a gap therebetween, and to support the at least one winding core between the front winding drum and the rear winding drum over the gap;
   wherein the winding core is supported on the front and rear winding drums so that the front winding drum forms a second winding nip with the winding core, and the rear winding drum forms a first winding nip with the winding core upstream of the second winding nip, so that a customer roll can be wound onto the core between and in nipping engagement with the front winding drum and the rear winding drum;
   a movable guard mounted for rotation about the front winding drum, having a downstream edge and an upstream edge and portions therebetween positionable to cover the front winding drum with the downstream edge adjacent the second winding nip formed by the front winding drum and a forming customer roll;
   an actuator connected to the guard to cause the guard to rotate;
   a cutter attached to the upstream edge of the movable guard; and
   the upstream edge of the movable guard and the cutter attached thereto positionable, by rotation of the guard to move up from below the gap, through the gap to position the cutter to sever the fiber web above the gap.

2. The winder of claim 1 wherein the cutter is a web cutting blade that is hingedly connected by a joint to the upstream edge of the guard.

3. The winder of claim 1 wherein the guard further comprises a core loader mounted to the downstream edge so that a core can be delivered to be supported between the front winding drum and the rear winding drum over the gap, by rotation of the guard.

4. The winder of claim 1 wherein the movable guard with the cutter is movable in an arcuate path around the front winding drum.

5. The winder of claim 1 wherein the guard comprises at least one part covering at least a part of a circumference of the front winding drum the at least one part being spaced apart from the surface of the front winding drum.

6. The winder of claim 1 wherein the guard further comprises a flexible part attached to the guard between the downstream edge and the upstream edge.

7. The winder of claim 1 wherein the winder guard is arranged to be movable on an outside support guide.

8. The winder of claim 1 wherein the winder guard is arranged to be supported on support structures of the front winding drum.

9. The winder of claim 4 wherein the movable guard with the cutter is provided with support rolls that are attached to the guard and ride guide grooves of a guide support to move the movable guard with the cutter on the guide support.

* * * * *